Jan. 19, 1965  W. E. HUTCHISON  3,166,446
INVERTIBLE DEEP-SUBMERGENCE POWER SUPPLY
Filed March 9, 1964  2 Sheets-Sheet 1

INVENTOR.
WILLISTON E. HUTCHISON
BY
ATTORNEYS

Jan. 19, 1965 W. E. HUTCHISON 3,166,446
INVERTIBLE DEEP-SUBMERGENCE POWER SUPPLY
Filed March 9, 1964 2 Sheets-Sheet 2

INVENTOR.
WILLISTON E. HUTCHISON
BY
ATTORNEYS

United States Patent Office 3,166,446
Patented Jan. 19, 1965

3,166,446
INVERTIBLE DEEP-SUBMERGENCE
POWER SUPPLY
Williston E. Hutchison, 7945 Michelle Drive,
La Mesa, Calif.
Filed Mar. 9, 1964, Ser. No. 350,616
16 Claims. (Cl. 136—6)
(Granted under Title 35, U.S. Code (1952), sec. 266)

The invention described herein may be manufactured and used by or for the Government of the United States of America for governmental purposes without the payment of any royalties thereon or therefor.

This application is a continuation-in-part of application, Serial No. 123,325, filed July 11, 1961, entitled "Deep Submergence Power Supply."

The present invention relates to an underwater power supply capable of deep submergence in ocean depths and, more particularly, to such a power supply which comprises a liquid-electrolyte battery which can be inverted in its submergence or even tumbled about on the ocean floor without disruption to its normal operation.

Deep exploration in the ocean has been greatly handicapped by available power supply. In such a deep-sea research vessel such as the Bathyscaph Trieste, for example, the only power available had to be carried inside the pressure-proof sphere, the limited space where the operators are housed. Power cables from a tender or surface ship as a source of power supply are too long and heavy and thus too unwieldy to be practical or feasible.

The present invention involves a liquid-electrolye battery power supply adapted for use, for instance, with the aforementioned deep sea submersibles and which employs standard low-price storage batteries. This particular power supply can be operated at deep-submergence levels without the requirement that it be housed within the valuable limited space available within the research vessel shell. It is related to, but represents an improvement over that power supply defined in parent application, Serial No. 123,325 (supra) in that the presently-defined power supply has the additional feature of being able to withstand inversion of its normally-upright position or titlting from such position or even being tumbled about such as on the ocean floor, for example, without any significant detriment to its operative function. The present invention is not necessarily limited to use with deep-submergence research vessels. It can be installed on the deck of any general type submarine for providing an additional underwater power source. It can be employed in connection with expendable submerged sonar detection devices or undersea weapons requiring power sources. It also can be used in conjunction with sound beacons, lighting for underwater photography, and communication purposes, as well as a variety of other purposes.

Among objects of importance of the present invention are:

To provide a submersible battery-type power supply capable of operating at up to extreme ocean depths and in any given attitude of position.

To provide a submersible battery-type power supply capable of submersion in immediate contact with an ocean medium.

To provide a submersible battery-type power supply able to withstand being tumbled about in an ocean medium without loss of operating capability.

Other objects and many of the attendant advantages of this invention will be readily appreciated as the same becomes better understood by reference to the following detailed description when considered in conjunction with the accompanying drawings wherein.

Figure 1:
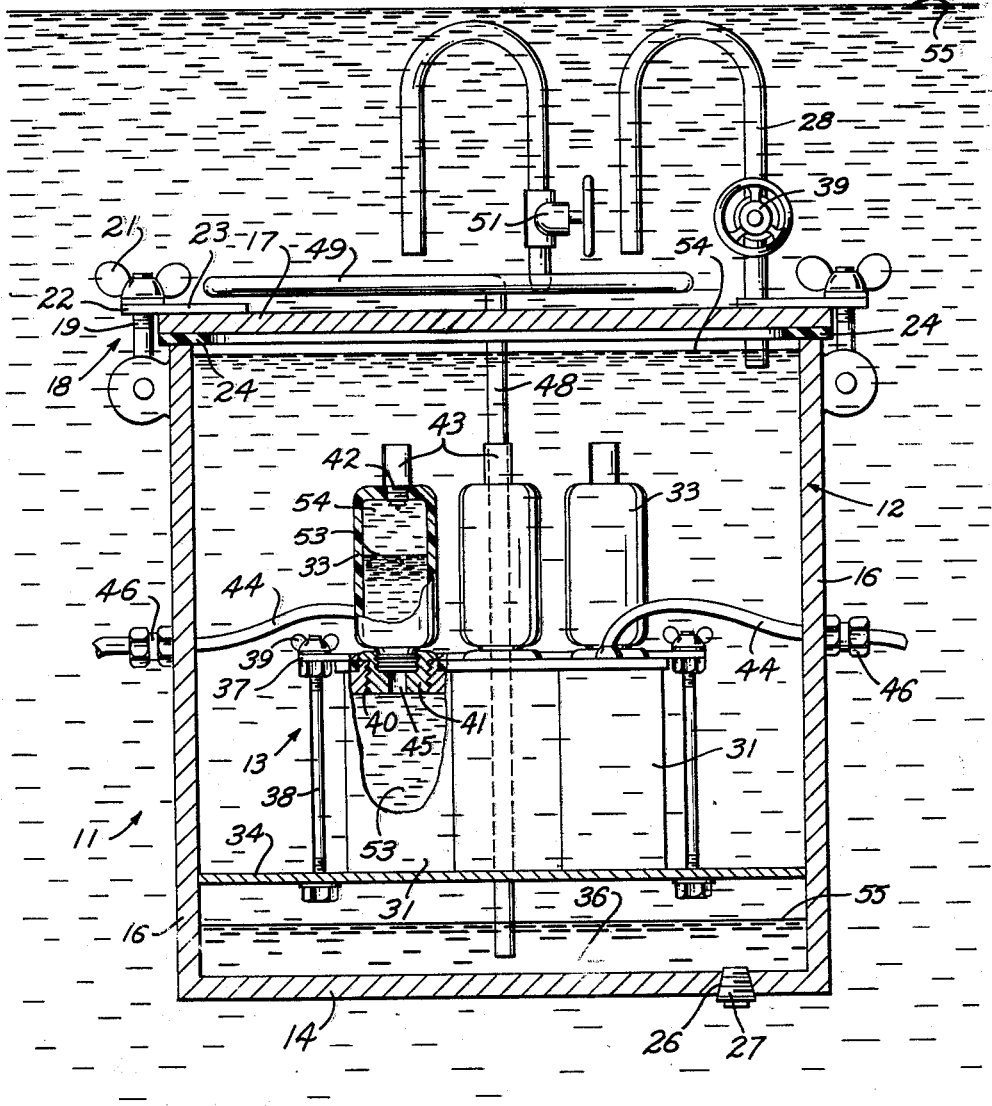
FIG. 1 is a front elevational view, partly in section of the power supply of the invention.
Figure 2:
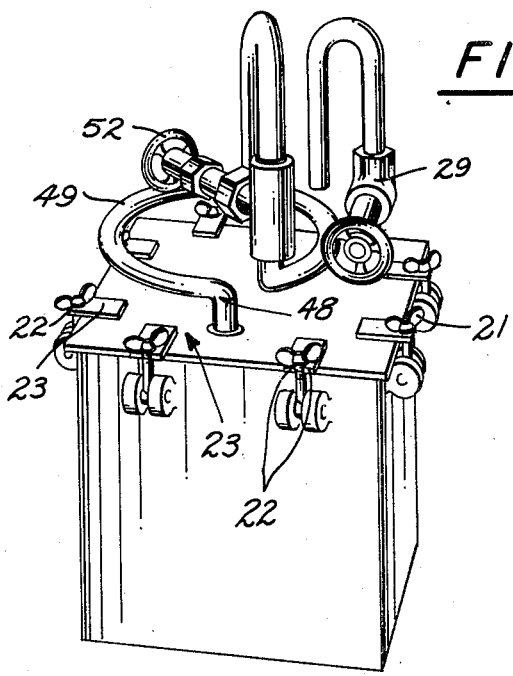
FIG. 2 is a top-viewpoint perspective view of the FIG. 1 embodiment which highlights the pressure-equalizer tube configuration which permits the power supply to endure tilting or even inversion while immersed in water.
Figure 3:
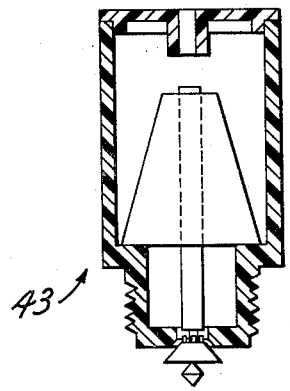
FIG. 3 is a sectional view of the "aircraft-type" battery valve employed in the invention—when in "open" position.

Referring now to the drawing, the power supply 11 as best seen in its entirety in FIG. 1 consists generally of a housing 12 within which is situate a multi-cell storage battery 13 preferably of the acid-electrolyte type.

Housing 12 is, in essence, a watertight box with a removable lid. It comprises a bottom 14, four sides, each of which is designated with the numeral 16, and a top or lid 17. Lid 17 of housing 12 is removable and is held in closing position atop sides 16 by a series of dog members 18. Each of these dog members 18 consists of a bolt 19 and a wing nut 21. Each of these bolts 19 is pivotally mounted at one end to one of the sides 16 and at its other end is threaded to receive its associated wing nut 21. When lid 17 is secured in housing-closing position each of the bolts 19 is pivoted to an upright position as seen in FIG. 1. In this position the individual bolt 19 fits into a channel formed between a pair of lips 22 carried by a protruding member 23 which is fixedly mounted to the top of lid 17 as shown. The wing nut 21 associated with the given bolt 19 is then mated with the threaded end of the given bolt 19 and screwed down into tightened position against the underlying lips 22 of protruding member 23. With several such dog members 18 associated with each side of lid 17, this lid 17 is forced down with compressive stress against a gasket 24 which lies intermediate sides 16 and lid 17 to ensure a watertight closure of the top of housing 12 by lid 17.

At its bottom 14, housing 12 is provided with an opening 26 which, in turn, is sealed by a removable plug 27 inserted thereinto. By way of this opening 26, when plug 27 is removed, housing 12 is drained of liquid contained therein when this step is desired.

A gas vent tube 28, controlled by valve 29, is provided in the lid 17 of housing 12 to permit the escape of battery-derived gas from the interior of housing 12. Such gas is particularly prevalent during the period when a battery contained by housing 12 is being charged at a time when housing 12 is surface-borne.

Centrally disposed within housing 12 is the liquid-electrolyte multi-cell battery 13 comprising a plurality of individual cells 31. As previously stated, this storage battery 13 is preferably of the acid electrolyte type. Storage battery 13 is provided at its top portion with a series of electrolyte reservoirs 33 at least one of which is associated with each individual battery cell 31. As seen in its upright position in FIG. 1, storage battery 13 is supported on a grill 34 which is fixedly positioned inside housing 12 and which is spaced above the bottom of this housing 12 as shown to provide an area 36 which serves to accommodate sea-water which makes its entry into housing 12 in a manner to be described infra. The spacing between grill 34 and the bottom of housing 12 is sufficient to keep the bottom of battery 13 out of contact with any sea-water present in area 36 during the operation of power supply 11. Battery 13 can be constructed of a material which is unaffected by contact with sea-water and, with the battery top and battery leads well insulated, a rise in level of sea water within housing 12 even to the top of battery 13 will not affect its operation. However, it is preferred to provide a large salt water "surge tank section," as represented by area 36 in FIG. 1, in the housing 12 as a safety factor which keeps battery 13 out of contact with salt water admitted into housing 12. Battery 13 is held in fixed position within housing 12 by means of a series of straps 37 which run over the top of the battery 13 and which are held in tightened-down position atop battery 13 by the coaction of a series of tie-rods 38 and complementary wing nuts 39 one of which mates with the respective threaded ends of each of the tie-rods 38. As best seen in FIG. 1, each of these tie-rods 38 extends between grill 34 and its associated strap 37 and is secured to each of these respective members by the adjacent nut 39. Thus the battery 13 is held firmly in place within housing 12 by the various straps 37 and their associated tie-rods 38 and wing nuts 39.

The top of battery 13 is formed with a plurality of openings 40 therein, each of which is individual to one of the battery cells 31 and each of which is threaded to matedly receive a complementarily-threaded adapter cap 41. Each adapter cap 41, in turn, is threaded at its upper portion to matedly receive, in fluid-tight connection, one of the electrolyte reservoirs 33. Each electrolyte reservoir 33 is in fluid communication with its associated battery cell 31 by way of the central bore 45 passing through its associated adapter cap 41. Each of the respective electrolyte reservoirs 33 is provided at its uppermost end, as seen in FIG. 1, with a vent hole 42 in which there is positioned a vent plug 43 of the type generally employed in aircraft storage batteries. These vent plugs 43 are of a conventional type and are illustrated by any of the following-noted issued patents: (a) Patent No. 2,717,610, (b) Patent No. 1,486,985, (c) Patent No. 2,306,974. All of these vent plugs function in substantially the same manner in that they allow free fluid access through the vent hole in which they are inserted when they are in an upright position and block access through the given vent hole when they are tilted to any position other than this particular upright position.

The battery or power leads 44, which are heavily insulated, pass through stuffing boxes 46 (which are secured to the appropriate sides 16 of housing 12) and into housing 12 to fasten to the battery terminals 47. These respective power leads 44 will lead from the power supply 11 to the particular equipment for which power is being supplied. Passing through the lid 17 of housing 12 in watertight-fit therewith is a pressure-equalizing tube 48 which extends downwardly into the bottom of housing 12, its lowermost end being located in the area 36 which is intended to accommodate sea-water and preferably very closely adjacent the bottom of housing 12. Passing out of housing lid 17, pressure-equalizing tube 48, a short distance above lid 17, assumes a circular configuration which substantially lies in a horizontal plane as viewed when housing 12 is in its normal upright position. Pressure-equalizing tube 48 proceeds upwardly from the aforedescribed circular section 49 to pass through the globe valve 51 which can be opened or closed, as appropriate, by manipulation of the controlling handle 52 therefor. Leaving globe valve 51, pressure-equalizing tube 48 then assumes a vertically-disposed inverted U-tube shape (as seen with housing 12 in its normal upright position).

The interior of storage battery 13 is filled with the appropriate liquid electrolyte 53 and each of the electrolyte reservoirs 33, which are mounted atop battery 13 and which are individually in free fluid communication with their respective associated battery cells 31, is partially filled with this same electrolyte 53, as seen, for example, in FIG. 1. These electrolyte reservoirs 33, in effect, enable a raising of the operative electrolyte level of the battery 13. With the battery 13 completely filled with liquid electrolyte 53 and with the same liquid electrolyte 53 filling the passageways in the respective adapter caps 41 and partially filling each of the respective electrolyte reservoirs 33, as shown in FIG. 1, battery 13 is assured of adequate electrolyte supply despite significant tilting of the housing 12 from its normal upright position. Storage battery 13 and its ancillary reservoirs 33 are surrounded within housing 12 by a dielectric oil 54. This dielectric oil 54 is lighter than the liquid electrolyte 53 (that is, dielectric oil 54 has a smaller specific gravity than does liquid electrolyte 53). Dielectric oil 54 also will have a specific gravity which is less than the specific gravity of the outside water medium. By way of the vent holes 42 and the open-position vent plugs 43 in the respective electrolyte reservoirs 33 this dielectric oil 54 will find its way into each of the respective electrolyte reservoirs 33 to fill the upper portion of each reservoir 33 which is not filled by the liquid electrolyte 53.

When power supply 11 is on the surface and prior to its operative immersion into sea-water, gas generated by the storage battery 13 is allowed to escape from the housing 12 by opening valve 29. This venting of gas through gas vent tube 28 is especially necessary when the battery 13 is being charged on the surface. When this gas venting operation is completed, valve 29 is closed to seal off the gas vent tube 28.

With gas vent tube 28 closed off and with the lid 17 of housing 12 in place and dogged down against rubber gasket 24, the entire void space within housing 12, except for that portion filled by the electrolyte 53, is completely filled with the insulating dielectric oil 54. Since this filling of housing 12 with dielectric oil 54 takes place with housing 12 in its normal upright position, the vent plugs 43 of the respective electrolyte reservoirs 33 will be in their open positions with respect to their respective vent holes 42 with the result that the dielectric oil 54 will completely fill each of the electrolyte reservoirs above the level of the electrolyte 53 contained thereby. The dielectric oil 54 can be pumped into the interior of housing 12 by way of pressure-equalizing tube 48 whose globe valve 51 is maintained in the open position during this "filling" operation.

With gas vent tube 28 closed off by valve 29 and with pressure-equalizing tube 48 open to fluid flow because of the open position of globe valve 51, power supply 11 is ready for descent into the sea. As the ocean depth, to which the power supply descends, increases, pressure-equalizing tube 48 enables an equalization between the internal and external pressures experienced by housing 12. As the external sea pressure increases, the heavier sea pressure will be transmitted to the liquid contents within housing 12 to bring the internal hydrostatic pressure into equilibrium with the external hydrostatic pressure. In this process where heavy seat pressures are encountered, a limited volume of sea water will be forced into housing 12 by way of this pressure-equalizer tube 48 and, assuming that housing 12 is maintained in its upright position as seen in FIG. 1 (which is the intended operative position for descent of power supply 11 into ocean depths), this intruding sea water will locate in housing area 36. Because the intruding sea water is substantially heavier than dielectric oil 54 it will maintain its position in area 36 (assuming the housing 12 continues to be upright) which in effect operates as a salt water surge section.

By way of this pressure-equalizing tube 48 a hydraulic link is effected between the outside water medium and the liquid aggregate (consisting of liquid electrolyte 53 and dielectric oil 54) present within housing 12. As the external water medium increases in hydrostatic pressure (with increased ocean descent of power supply 11) the hydrostatic pressure within housing 12 will correspondingly increase because of this hydraulic link and when the outside hydrostatic pressure decreases (generally with ascent of the power supply 11) the hydrostatic pressure within housing 12 will correspondingly decrease.

With reference now to the capacity of the power supply 11 to withstand tilting, inversion or even being tumbled about, such as on the ocean floor, without disruption to its normal operation, the vent plugs 43 come into play, when the housing 12 takes an attitude which differs from its normal upright position, to seal off vent holes 42 in the electrolyte reservoirs 33, thus ensuring against any significant loss of liquid electrolyte 53 from battery 13 such as would otherwise be occasioned by tilting or inversion of the housing 12. Loss of dielectric oil 54 from inside housing 12 by tilting, etc., on the other hand, is prevented by the particular configuration of pressure-equalizing tube 48 in that portion of pressure-equalizing tube 48 which is external to housing 12. Because the specific gravity of dielectric oil 54 is substantially less than that of water, when housing 12 is in submerged position in water and pressure-equalizing tube 48 is in free communication with the external water medium, the configuration of pressure-equalizing tube 48, especially in its portion external to housing 12, is such that for any given angle and attitude of tilt of housing 12, dielectric oil 54 will have to travel a downward path (in the direction of gravity) in some portion of pressure-equalizing tube 48 in order to be able to escape through pressure-equalizing tube 48 into the outside water medium. Since this is impossible because of its small specific gravity (relative to the specific gravity of the external water medium), dielectric oil 54 cannot escape from power supply 11 during any tilting experienced thereby. Thus loss of dielectric oil 54 from power supply housing 12 is prevented during any tilting or inversion session experienced by power supply 11.

The bore 45 in each of the adapter caps 41 is relatively small in diameter, 3/32 of an inch being a representative bore diameter size. The smallness of this bore 45 precludes any rapid exchange between dielectric oil 54 in the electrolyte reservoir 33 and liquid electrolyte 53 in the associated battery cell 31 during any period of inversion of power supply housing 12 and since, in operation, the power supply housing 12 is not allowed to remain in its inverted position for any prolonged period of time, no significant amount of dielectric oil 54 finds its way into battery 13. Even if it were to do so, it has been found that the amount of dielectric oil involved would not significantly affect the given operation of the battery, but merely would have an effect upon the battery's life if present therein for a sufficient period of time.

Sea water 55 which has found its way into housing 12 by way of pressure-equalizing tube 48 will, of course, shift its position within housing 12 from area 36 to a like oriented position as determined by the given angle of tilt experienced by housing 12 during any tilting or inversion episode. Because it is desirable to keep battery 13 out of contact with sea water, battery 13 is suspended herein in the central portion of housing 12 so that, for any given position of tilting or inversion experienced by the power supply 11, battery 13 generally will be out of contact with sea water 55 within the housing 12 regardless of the given degree of tilting or attitude of tilt involved.

Figure 5:
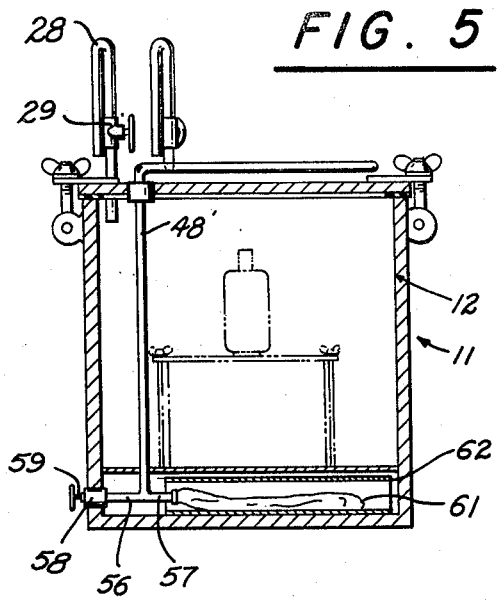
FIG. 5 portrays an alternative embodiment of the power supply of the invention which utilizes a modified pressure-equalizer tube.
Figure 4:
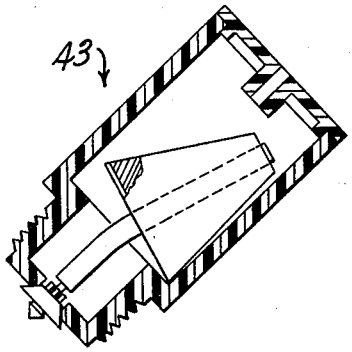
FIG. 4 is a sectional view of the valve shown in FIG. 3—when in "closed" position.

To meet the condition where no amount of "naked" sea water can be tolerated in housing 12, an alternative embodiment of the power supply of the invention is presented in which no external medium water is permitted to directly contact battery 13. FIG. 5 portrays this alternative embodiment. In this modified embodiment the only significant change in the power supply (as compared with the previously-defined embodiment) relates to the lower portion of the pressure-equalizing tube. In its upper portion, the pressure-equalizing tube 48' of the modified embodiment is constructed exactly as is the previously defined pressure-equalizing tube 48 of the embodiment represented by FIGS. 1 to 4. The balance of the power supply is basically unaltered in this FIG. 5 embodiment and generally carries therein the same reference numerals as were employed in FIGS. 1–4. Looking now to pressure-equalizing tube 48', at its lower portion this pressure-equalizing tube 48' is roughly T-shaped (inverted) to form a left-hand portion 56 and a right hand portion 57. Left-hand portion 56 extends to and is in fluid communication with an opening 58 formed in one of the sides of housing 12. This opening 58 is provided with a drain plug 59. The right-hand portion of the T is open-ended and has attached thereto, in a watertight fit, a plastic bag or sac 61. Whereas in the originally-defined embodiment, sea water which made its way into pressure-equalizing tube 48 during the process of dynamic pressure-equalization was allowed to accumulate in the area 36 within housing 12, in this particular embodiment, represented in FIG. 5, sea water which makes its way down through pressure-equalizing tube 48' will be received and held by plastic bag 61 which is adapted to inflate, as necessary, to compensate for the related pressure differential. Thus held by plastic bag 61, the sea water which has made its way into housing 12 will be kept out of direct contact with any of the operative elements within the housing 12. Located in fixed position around plastic bag 61 is a wire mesh screen 62 which serves to generally limit the possible position of plastic bag 61, even though housing 12 takes an accentuated tilting or an inverted position. During operative submersion, the drain plug 59, which is located in the opening 58 at the end of left-hand portion 56 of pressure-equalizing tube 48' is in opening-closing position. When power supply 11 has been hoisted out of the water to its standby position, any sea water which has collected in plastic bag 61 and pressure-equalizing tube 48' can be readily drawn off by extracting drain plug 59 from its opening 58 thereby permitting removal of sea water from inside housing 12 without any loss of oil or any disassembly.

Obviously many modifications of the present invention are possible in the light of the above teachings. It is intended to cover all changes and modifications which may be made without departing from the spirit and scope of this invention.

What is claimed is:
1. A submersible power supply, adapted to be immersed in a water medium in immediate contact therewith and to operate over a wide range of depths, up to and including great depths, in said water medium, comprising:
 (a) a watertight housing;
 (b) a liquid-electrolyte multi-cell battery centrally disposed in fixed position within said housing, said battery comprising a plurality of individual cells and having a top, a bottom and a plurality of sides, the top of said battery being provided with a plurality of openings at least one of which is associated with each of said individual cells;
 (c) a plurality of liquid-electrolyte reservoirs mounted atop said liquid-electrolyte battery, each of said reservoirs being in fluid communication with one of said battery cells by way of one of said openings in the top of said battery, each of said liquid-electrolyte reservoirs having an opening in its uppermost end;
 (d) electrolyte liquid, respective parts of which completely fill the various cells of said battery and respective parts of which fill a substantial portion of each of the various electrolyte reservoirs, the electrolyte liquid in each of said plurality of electrolyte reservoirs being in free fluid exchange with the electrolyte liquid in its associated battery cell;
 (e) dielectric liquid, characterized by a specific gravity which is less than the specific gravity of said outside water medium and which is also less than the specific gravity of said electrolyte liquid, filling the balance of each of said reservoirs which is not filled by said electrolyte liquid and filling the otherwise-void spaces within said housing;
 (f) valve means, positioned in the opening in the uppermost end of each of said reservoirs, for permitting free fluid communication by way of said reservoir opening between the given reservoir and the interior portion of said housing which is extraneous to the combination of said battery and said reservoirs when said watertight housing is in its upright position and for blocking fluid flow by way of said reservoir opening when said housing has been tilted from its upright position;

(g) pressure-equalizing means, passing into said housing in watertight connection therewith, for permitting free flow of the outside water medium into and out of said housing while at the same time preventing outward flow from said housing of any significant portion of said dielectric liquid present in said housing, whereby to effectuate a dynamic equalization of the hydrostatic pressure within said housing with the hydrostatic pressure of the outside water medium while at the same time preventing disablement of said power supply due to tilting of said housing from its upright position in said water medium; and (h) a pair of electrical conduction means, one of which is connected to each of the respective poles of said battery, and which are adapted to interconnect to a pair of power leads which are external to said housing, for transporting electrical power to said power leads and any power consumer to which said power leads run.

2. The submersible power supply of claim 1 wherein said pressure equalizing means comprises a continuous open-ended fluid conduit, part of which is within said housing and part of which is without said housing, that part of said fluid conduit which is within said housing extending from the top of said housing to almost the bottom of said housing and that part of said fluid conduit which is without said housing having a configuration which requires that any fluid which passes from said housing into said water medium by way of said fluid conduit must somewhere in its path through that part of said conduit which is without said housing travel in the direction of gravity regardless of the given attitude of said housing, whereby to prevent any significant loss from said housing of said dielectric liquid when said housing has assumed a position in said water medium which is different from its normal upright position.

3. The submersible power supply of claim 2 wherein, as viewed in the normal upright position of said housing, that part of said continuous fluid conduit which is within said housing is substantially vertically disposed and that part of said conduit which is without said housing in its shape configuration forms a substantially-closed annular ring followed by a substantially vertically-disposed inverted-U-shaped portion.

4. The submersible power supply of claim 2 further characterized by a distensible sac member having a neck-defining opening therein, said distensible sac member having its neck mounted in watertight union with the lowermost portion of that part of said conduit which is within said housing so that said sac member and said conduit are in free fluid communication with each other.

5. The submersible power supply of claim 4 further characterized by drainage means connected to the bottommost portion of said conduit for enabling, at operator discretion, drainage from said conduit of any liquid contained therein.

6. The submersible power supply of claim 4 further characterized by restraining means, disposed about said distensible sac member, for placing general limits upon the position of said sac member within said housing.

7. The submersible power supply of claim 3 further characterized by a distensible sac member having a neck-defining opening therein, said distensible sac member having its neck mounted in watertight union with the lowermost portion of that part of said conduit which is within said housing so that said sac member and said conduit are in free fluid communication with each other.

8. The submersible power supply of claim 7 further characterized by drainage means connected to the bottommost portion of said conduit for enabling, at operator discretion, drainage from said conduit of any liquid contained therein.

9. The submersible power supply of claim 8 further characterized by restraining means, disposed about said distensible sac member, for placing general limits upon the position of said sac member within said housing.

10. The submersible power supply of claim 2 further characterized by operator-controllable valve means, disposed in said conduit, for enabling opening or closing of the fluid passageway through said conduit at operator election.

11. The submersible power supply of claim 1 further characterized by operator-controllable gas-venting means, disposed at the top of said housing, for enabling said housing, when surface-borne, to be purged of any gas generated therein from said battery.

12. A submersible power supply, adapted to be immersed in a water medium in immediate contact therewith and to operate over a wide range of depths, up to and including great depths, in said water medium, comprising:

(a) a watertight housing;

(b) a liquid-electrolyte battery centrally disposed in fixed position within said housing, said battery comprising at least one cell and having a top, a bottom, and a plurality of sides, the top of said battery being provided therein with an opening associated with said cell;

(c) a liquid-electrolyte reservoir mounted atop said battery in fluid communication with said battery cell by way of said opening in the top of said battery, said liquid-electrolyte reservoir having an opening in its uppermost end;

(d) electrolyte liquid, part of which completely fills said battery cell and part of which fills a substantial portion of said electrolyte reservoir;

(e) dielectric liquid, characterized by a specific gravity which is less than the specific gravity of said outside water medium and which is also less than the specific gravity of said electrolyte liquid, filling the balance of said reservoir which is not filled by said electrolyte liquid and filling the otherwise-void spaces within said housing;

(f) valve means, positioned in the opening in the uppermost end of said reservoir, for permitting free fluid communication by way of said reservoir opening between said reservoir and the interior portion of said housing which is extraneous to the combination of said battery and said reservoir when said watertight housing is in its upright position and for blocking fluid flow by way of said reservoir opening when said housing has been tilted from its upright position;

(g) pressure-equalizing means, passing into said housing in watertight connection therewith, for permitting free flow of the outside water medium into and out of said housing while at the same time preventing outward flow from said housing of any significant portion of said dielectric liquid present in said housing, whereby to effectuate a dynamic equalization of the hydrostatic pressure within said housing with the hydrostatic pressure of the outside water medium while at the same time preventing disablement of said power supply due to tilting of said housing from its upright position in said water medium; and (h) a pair of electrical conduction means, one of which is connected to each of the respective poles of said battery, and which are adapted to interconnect to a pair of power leads which are external to said housing, for transporting electrical power to said power leads and any power consumer to which said power leads run.

13. The submersible power supply of claim 12 wherein said pressure equalizing means comprises a continuous open-ended fluid conduit, part of which is within said housing and part of which is without said housing, that part of said fluid conduit which is within said housing extending from the top of said housing to almost the bottom of said housing and that part of said fluid conduit which is without said housing having a configuration which requires that any fluid which passes from said housing into said water medium by way of said fluid conduit must somewhere in its path through that part of said conduit which is without said housing travel in the direction of gravity regardless of the given attitude of said housing, whereby to prevent any significant loss from said housing of said dielectric liquid when said housing has assumed a position in said water medium which is different from its normal upright position.

14. The submersible power supply of claim 13 wherein, as viewed in the normal upright position of said housing, that part of said continuous fluid conduit which is within said housing is substantially vertically disposed and that part of said conduit which is without said housing in its shape configuration forms a substantially-closed annular ring followed by a substantially vertically-disposed inverted-U-shaped portion.

15. The submersible power supply of claim 1 wherein said pressure-equalizing means comprises a continuous open-ended conduit which, in turn, comprises:
   (a) a substantially vertically-disposed lower portion disposed within said housing and which extends to almost the bottom of the interior of said housing; and
   (b) an upper portion, continuous with said lower portion and which extends out of said housing into said water medium, said upper portion having a configuration which requires that any fluid which passes from said housing into said water medium by way of said fluid conduit must somewhere in its path through said upper portion travel in the direction of gravity regardless of the given attitude of said housing, whereby to prevent any significant loss from said housing of said dielectric liquid when said housing has assumed a position in said water medium which is different from its normal upright position.

16. The submersible power supply of claim 15 wherein, as viewed in the normal upright position of said housing, said upper portion of said conduit is characterized in part by a shape configuration which forms a substantially-closed annular ring followed by a substantially vertically-disposed inverted-U-shaped portion.

References Cited by the Examiner
UNITED STATES PATENTS 2,930,828    3/60    Herold _____ 136—181

JOHN H. MACK, *Primary Examiner.*